Oct. 30, 1923.
J. SCHERNER
1,472,764
TIRE WRAPPING MACHINE
Filed Aug. 4, 1921
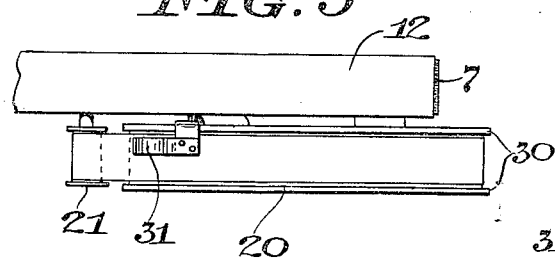
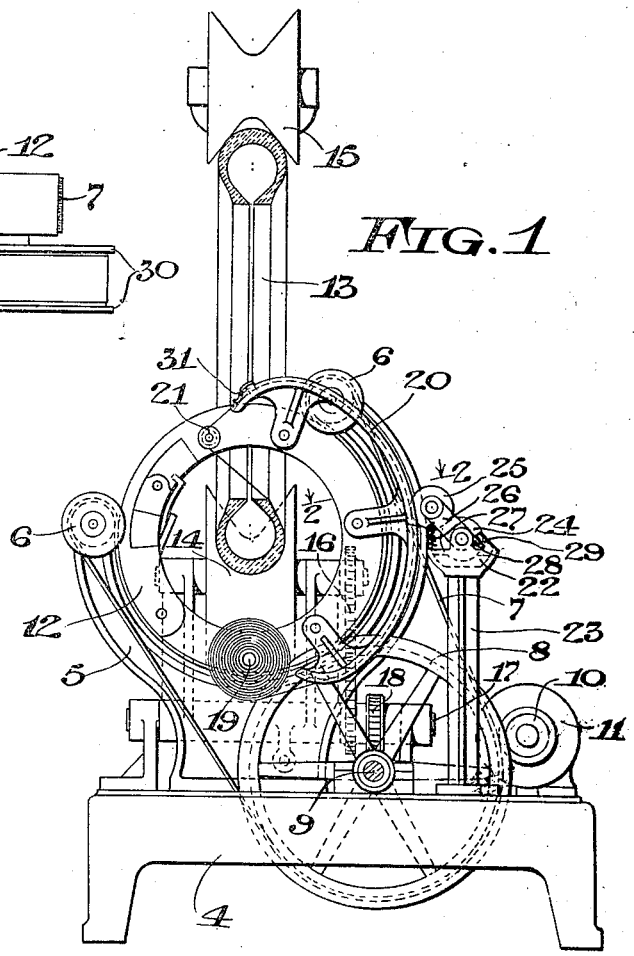
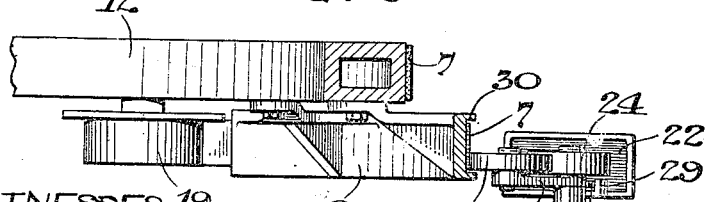
WITNESSES
INVENTOR
John Scherner
By R. S. Caldwell
ATTORNEY Patented Oct. 30, 1923.

1,472,764

UNITED STATES PATENT OFFICE.

JOHN SCHERNER, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

TIRE-WRAPPING MACHINE.

Application filed August 4, 1921. Serial No. 489,845.

*To all whom it may concern:*

Be it known that I, JOHN SCHERNER, a citizen of the United States, and resident of Milwaukee, in the county of Milwaukee and State of Wisconsin, have invented new and useful Improvements in Tire-Wrapping Machines, of which the following is a description, reference being had to the accompanying drawings, which are a part of this specification.

The invention relates to wrapping machines, and more particularly to a tire wrapping machine for wrapping rubber tires, such as automobile tires or casings, with a spiral wrapping or covering strip of paper or other suitable material.

The essential object of the invention is to provide a wrapping machine in which the spirally wound covering strip is supplied with adhesive to unite the adjacent edges of the turns of the strip as it is wound about the tire so that the covering will be firmly held in place and be prevented from unwinding even if broken in spots, the construction providing a simple and positive feed of adhesive to the wrapping material.

The invention further consists in the several features hereinafter set forth and more particularly defined by claims at the conclusion hereof.

In the drawings: Fig. 1 is a side elevation of a wrapping machine embodying the invention; Fig. 2 is a detail sectional view taken on the line 2—2 of Fig. 1; Fig. 3 is a detail plan view of parts of the machine.

In the drawings the numeral 4 designates a supporting table carrying a bracket 5 upon which rollers 6 are mounted which receive a belt 7 that runs over a drive pulley 8, the drive pulley, as shown, being driven by a friction wheel 10 on the shaft of an electric motor 11. An annular shuttle 12 is mounted between the rollers 6 and pulley 8 and is continuously rotated by running a portion of the belt 7 about the shuttle and then over the pulleys 6, as shown in the drawing and as well understood by those skilled in this art. The article to be wrapped, such as an automobile tire casing 13, is supported upon spaced rollers 14, only one being shown, and a guide roller 15, in a well known manner, so that the tire moves through the eye or central opening of the shuttle as the shuttle revolves. As shown, the roller 14 is driven through a chain drive 16 from a shaft 17 having a gear connection 18 with the shaft 9 of the pulley, all of which is of well known construction.

A reel of paper or other suitable wrapping material 19 is mounted at a suitable point upon the shuttle 12 and from this source the wrapping material passes over an arcuate table 20 carried by the shuttle and from thence to a guide roller 21 and then over the tire. The length of this arcuate table is preferably equal to about half the circumference of the shuttle so that a relatively long length of wrapping material is disposed upon this table. The length of paper on the table is substantially equal to double the length of paper required to make one turn around the tire as wrapped. This table is for the purpose of forming a support for the paper while the adhesive is being applied thereto. The means for applying the adhesive to the paper consists of a supply tank 22 for adhesive mounted on an upright bracket 23 into which a roller 24 dips and with which a roller 25 is in rolling contact, the roller 25 being mounted upon a swinging arm 26 and yieldingly held against the wrapping paper by a spring 27, the swinging movement of the arm 26 being limited by the lower end 28 of the arm engaging a stop 29 on the tank 22. To prevent the strip jumping off the table 20 which, however, is provided with flanged sides 30, a spring clip 31 carried by said table is adapted to yieldingly engage the paper strip just before the same passes down to the pulley 21. While the whole strip may have adhesive applied thereto, it is only necessary to apply adhesive where the spiral turns overlap each other and consequently the roller 25 is narrower than the strip of wrapping material applied to the tire.

With the above construction, as the tire or casing moves through the rotating shuttle the paper or wrapping material on the roll 19 is unwound therefrom and wound up as a spiral covering upon the tire, and as this covering strip runs along the table 20 it receives adhesive from the roller 25 so that adjacent convolutions of the wrapping are suitably united together, the long table insuring a proper supply of adhesive to the entire length of paper as it comes off the roll. As the strip of paper on the table is long enough for substantially two coils about the tire the adhesive will be applied twice at the edge of the paper as wrapped. This is brought about by the fact that adhesive is applied to the whole length of paper on the table at each revolution of the shuttle but only half the length of paper is fed off the table at each shuttle revolution. In this arrangement the adhesive is applied in an improved manner. This construction insures a simple, positive and direct feed of glue to the covering material prior to its being wound up around the tire. As is well understood, the shuttle has a hinged section which permits the placing of the tire in position for winding purposes.

I desire it to be understood that this invention is not to be limited to any specific form or arrangement of parts except in so far as such limitations are specified in the claims.

What I claim as my invention is:

1. In a wrapping machine, the combination, with an annular shuttle having an open center to permit the rotation of a tire casing therein, a source of wrapping material mounted on said shuttle, means to support and rotate the tire casing with respect to said shuttle, and means for rotating said shuttle whereby to wrap material about said casing spirally, of a table for the wrapping material carried by the shuttle, said table of substantially twice the length of the cross periphery of the tire casing and means for supplying adhesive to said material while traveling with and over said table.

2. In a wrapping machine, the combination, with an annular shuttle having an open center to permit the rotation of a tire casing therein, a source of wrapping material mounted on said shuttle, means to support and rotate the tire casing with respect to said shuttle, and means for rotating said shuttle whereby to wrap material about said casing spirally, of a table for the wrapping material carried by the shuttle, an adhesive-supplying roller engageable with the material upon said table along a vertical tangent line with respect to the table rotation, and means for feeding adhesive to said roller.

3. In a wrapping machine, the combination with an annular shuttle having an open center to permit the rotation of a tire casing therein, a source of wrapping material mounted on said shuttle, means to support and rotate the tire casing with respect to said shuttle, and means for rotating said shuttle whereby to wrap material about said casing spirally, of a curved table of a length sufficient to give the paper thereon a substantial curvature for the wrapping material carried by the shuttle, a swinging roller yieldingly engageable with the wrapping material moving on and with said table, yielding means to press the paper against the table, and means for feeding adhesive to said roller.

4. In a wrapping machine, the combination with mechanism for wrapping a covering strip spirally about a tire or tire casing, the mechanism including a rotating shuttle carrying the wrapping material, of an adhesive-carrying roller mounted adjacent said shuttle, approximately at a point level with the axis of the shuttle, and means for guiding the material into feeding contact with said roller.

5. In a wrapping machine, the combination, with mechanism for wrapping a covering strip spirally about a tire or tire-casing the mechanism including a rotating shuttle carrying the wrapping material, of an arcuate table of substantial curvature carried by said shuttle and upon which the material moves, a spring clip at the discharge end of said table, and means for supplying adhesive to the material while passing over said table.

In testimony whereof, I affix my signature.

JOHN SCHERNER.